(12) United States Patent
Barkan et al.

(10) Patent No.: US 9,667,761 B2
(45) Date of Patent: May 30, 2017

(54) SYSTEM FOR AND METHOD OF ADAPTING A MOBILE DEVICE HAVING A CAMERA TO A READER FOR ELECTRO-OPTICALLY READING TARGETS

(71) Applicant: SYMBOL TECHNOLOGIES, LLC, Lincolnshire, IL (US)

(72) Inventors: Edward D. Barkan, Miller Place, NY (US); Mark E. Drzymala, Saint James, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/075,865

(22) Filed: Mar. 21, 2016

(65) Prior Publication Data

US 2016/0205231 A1    Jul. 14, 2016

Related U.S. Application Data (63) Continuation of application No. 14/069,777, filed on Nov. 1, 2013, now Pat. No. 9,300,769.

(51) Int. Cl.
  *H04M 1/02*    (2006.01)
  *H04M 1/725*   (2006.01)
  *G06K 7/10*    (2006.01)

(52) U.S. Cl.
  CPC ...... *H04M 1/0254* (2013.01); *G06K 7/10722* (2013.01); *G06K 7/10732* (2013.01);
  (Continued)

(58) Field of Classification Search
  CPC .................. G06K 7/10881; G06K 7/0004
  (Continued)

(56) References Cited

U.S. PATENT DOCUMENTS 6,837,435 B2    1/2005 Kehoe et al.
7,028,905 B2    4/2006 Sato et al.
(Continued)

FOREIGN PATENT DOCUMENTS

CN    101080742 A    11/2007
EP    0945818        9/1999
(Continued)

OTHER PUBLICATIONS

Office Action dated May 1, 2015 in related United Kingdom application GB1419524.2—available in parent U.S. Appl. No. 14/069,777.

(Continued)

*Primary Examiner* — Thomas Lett (57) ABSTRACT

A mobile device having a camera is adapted to serve as an electro-optical reader for electro-optically reading targets. The device is received and held in a housing having a rear wall. A top extension extends away from the rear wall at a top region of the device. A fold mirror is mounted on the top extension and is spaced away from a camera lens of the device. The fold mirror is inclined relative the rear wall and is operative for receiving at least a portion of a field of view imaged by the camera from each target along a first direction, and for folding and redirecting the field of view along a second direction generally perpendicular to the rear wall through the camera lens to the camera. A handle having a trigger assembly may be connected to the housing.

12 Claims, 10 Drawing Sheets

(52) U.S. Cl.
CPC ..... *G06K 7/10831* (2013.01); *G06K 7/10881* (2013.01); *H04M 1/026* (2013.01); *H04M 1/7253* (2013.01)

(58) Field of Classification Search
USPC ...................................................... 455/556.1
See application file for complete search history.

(56) References Cited

U.S. PATENT DOCUMENTS

| | | | |
|---|---|---|---|
| 7,054,148 B2 | 5/2006 | Chen et al. | |
| 7,337,257 B2 | 2/2008 | Landron et al. | |
| 7,552,264 B2 | 6/2009 | Landron et al. | |
| 7,673,804 B1* | 3/2010 | Hinson | G06K 7/10881 235/462.45 |
| 2010/0328420 A1* | 12/2010 | Roman | H04N 5/2251 348/14.08 |
| 2011/0081946 A1* | 4/2011 | Singh | H04M 1/0264 455/556.1 |
| 2011/0215162 A1 | 9/2011 | Challa et al. | |
| 2011/0295502 A1* | 12/2011 | Faenger | H04M 1/7253 701/431 |
| 2012/0168514 A1 | 7/2012 | Reed et al. | |
| 2014/0171150 A1* | 6/2014 | Hurst | H04M 1/0264 455/556.1 |
| 2014/0249947 A1* | 9/2014 | Hicks | G06Q 30/0641 705/21 |

FOREIGN PATENT DOCUMENTS

| | | |
|---|---|---|
| EP | 1724659 | 11/2006 |
| JP | 2004032507 | 1/2004 |
| KR | 1247150 | 4/2013 |
| WO | 2002009023 | 1/2002 |
| WO | 2008/027316 A2 | 3/2008 |
| WO | 2014182604 | 11/2014 |

OTHER PUBLICATIONS

The State Intellectual Property Office of the People's Republic of China, "First Office Action," mailed Dec. 1, 2016 in connection with Chinese Patent Application No. 201410606862.9 (16 pages).

* cited by examiner

SYSTEM FOR AND METHOD OF ADAPTING A MOBILE DEVICE HAVING A CAMERA TO A READER FOR ELECTRO-OPTICALLY READING TARGETS

RELATED APPLICATIONS

This is a continuation application of U.S. patent application Ser. No. 14/069,777, filed Nov. 1, 2013.

FIELD OF THE DISCLOSURE

The present disclosure relates generally to a system for, and a method of, adapting a wireless mobile device, such as a smart phone, which has a camera, to an electro-optical reader or portable terminal for electro-optically reading targets, such as bar code symbols.

BACKGROUND

For many years, various businesses have used mobile handheld terminals or computers with built-in, laser-based or imager-based, electro-optical readers, also known as scanners, for reading targets, such as bar code symbols, in such applications as tracking retail inventory, warehouse picking operations, and many others. These mobile terminals often have gun-like form factors, with a lower handle extending generally upwardly to an upper barrel that contains a laser-based or imager-based, scan engine that is aimed at a target to be scanned and read. The laser-based scan engine sweeps a laser beam across the target, and captures return laser light reflected or scattered by the scanned target. The imager-based scan engine captures and processes an image of the scanned target. A keyboard and/or a display are usually located on the upper barrel to allow a user to have ready manual and visual access to the terminal. These mobile terminals frequently include a radio frequency transceiver operative under at least one version of IEEE 802.11, such as Wi-Fi, to transmit data relating to the scanned target to a host computer, or to receive return data or instructions for the user. These mobile terminals have historically been manufactured specifically for users who need their combination of capabilities built into a durable, light-weight, and ergonomically-friendly package.

Recently, wireless communication mobile devices, such as smart phones, cell phones, tablets, personal digital assistants, and like handheld devices, have become available that include most, if not all, of the capabilities formerly only available in these mobile terminals. These handheld mobile devices typically have Wi-Fi and Bluetooth transceivers for radio frequency communication; cameras that can be used to scan and read targets, such as bar code symbols; touch screens and/or keyboards for user manual input; speakers for audible feedback to the user; and display screens for visual feedback to the user. Since such mobile devices, especially phones, for example, are built in much higher quantities than the mobile terminals described above, such phones are less expensive to purchase. As a result, some businesses that have traditionally used mobile terminals have attempted to use such phones instead for reading targets.

However, attempts to replace such purpose-designed mobile terminals with such phones have not been wholly satisfactory for a few reasons. A typical form factor for such a phone is a bar, also known as a slate, having a generally rectangular cuboid or generally flattened, box-like configuration with rounded or angled corners and edges. A generally rectangular touch screen is mounted at a front side of the phone, and a camera lens is mounted at an opposite rear side of the phone such that a field of view of the built-in camera generally looks outwardly in a direction perpendicular to the rear side. The location of the camera lens at the rear side of the phone, as well as the lack of a dedicated trigger switch located in a convenient place for initiating scanning, makes such phones clumsy-to-handle and slow-to-use as bar code symbol scanners. Also, such phones are somewhat delicate for the kinds of harsh environments in which they are often used.

Some attempts have been made to address these issues by creating adaptors, also known in the industry as "sleds". A selected phone is installed in a sled, which will partially enclose the phone to protect the phone from damage. Some of these sleds include a camera-based, scan engine oriented properly for easy scanning. Sometimes, a handle is provided on the bottom of the sled to provide gun-like ergonomics. In use, target data captured by the scan engine in the sled must be transmitted to the phone. This has been accomplished either by a Bluetooth transceiver in the sled paired to a Bluetooth transceiver in the phone, or by an electrical connector mounted on the sled that is plugged into a mating electrical connector on the phone.

The problem with these approaches is that any given sled design only works with a single model of phone. Pairing the phone to the sled for Bluetooth communication is time consuming and often confusing, and must be done for every phone/sled combination individually. This can be very time consuming for a user who must roll out large numbers of these devices. Different phones have different form factors, different data connectors, different electrical connector locations, different data interface protocols, etc. Furthermore, since phones evolve rapidly, and each phone model has a relatively short working lifetime, manufacturers of sleds must be continuously creating new sleds if the manufacturers are to satisfy their customers' desire to use the latest model phone. It can take a significant portion of the lifetime of a specific phone model for a sled manufacturer to respond, thereby making it difficult for the sled manufacturers to recoup their investment in each new sled configuration before the phone for which the new sled configuration was designed becomes obsolete. Furthermore, customers may not be willing to wait for a specific manufacturer to create a new sled. As a result, a sled manufacturer might lose an established customer if the sled manufacturer cannot respond with a new sled design as fast as a competitor can.

One solution for the connector problem just described has been to keep the reader and the phone as separate units, and to pair the separate units via Bluetooth technology. Although this solution suffers from the time consuming and confusing pairing drawbacks mentioned above, it does eliminate the need to deal with rapidly evolving phone form factors, etc., but results in a system that occupies two hands, which can make it difficult for a user to perform other parts of his or her job. For example, a user can put the phone in one pocket while scanning with the remote reader, but then the user cannot see the display or enter data on the keyboard of the pocketed phone. Or, the user can put the reader in one's pocket while observing the display on the phone, or when manually entering data on the phone's touch screen, but then the user cannot scan anything without retrieving the reader from one's pocket. This two-piece system can allow the user to perform the same functions of traditional mobile terminals, but at the expense of reduced convenience and efficiency.

Additional issues that afflict both the sled and remote scanner solutions include the fact that since the sled is utilizing the Bluetooth transceiver in the phone, the phone cannot pair to a Bluetooth earphone/microphone worn by a user, in applications where voice input or voice instructions will be used, and the Bluetooth transceiver in the phone also cannot be used to communicate to a host computer or cash register, as would be convenient in a point-of-sale (POS) application. An additional important issue is that these sleds or remote scanners are fairly expensive. Hence, the combination of phone and a sled/remote reader can approach the cost of a dedicated mobile terminal, thereby making the phone-based solution less appealing to the end user.

Also since the sled/remote reader includes a transceiver and a scan engine along with a microprocessor to decode targets and control the transceiver, the sled/remote reader must contain rechargeable batteries that need charging every day or two. The user must have a place in his or her business establishment to set up an array of battery chargers, and if the user forgets to charge the batteries, the sled/remote reader can become useless for a few hours while charging. A further issue is that if either the phone or the remote reader runs down its batteries in the middle of a work shift, both must be put aside until the discharged unit is recharged, to avoid the need to re-pair the reader to another phone employing Bluetooth, or to re-pair the phone to another reader, depending on which has consumed its batteries.

Accordingly, there is a need to enable a sled manufacturer to rapidly respond to evolving mobile device designs with minimal investment for each new device that is to be accommodated; to provide an extremely inexpensive sled; to not use Bluetooth pairing to interface with the mobile device so that the Bluetooth transceiver in the mobile device is available for other uses and so that the user does not waste time pairing, or re-pairing, the Bluetooth connection, if one unit of the device/reader system stops working due to damage or discharged batteries; to eliminate banks of battery chargers dedicated to the sled/reader system; to not use electrical connectors to interface the sled with the mobile device; to provide an integrated, single-handed solution so that a user does not occupy both of his or her hands while reading targets; to provide ergonomics that are as good as traditional mobile terminals; to direct the field of view of a camera in a direction that makes it easy to scan targets; and to provide a convenient mechanical trigger for initiating reading.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a system for adapting a wireless mobile device, e.g., a smart phone, a cell phone, a tablet, a personal digital assistant, or a like handheld device, which has a built-in camera, to an electro-optical reader, e.g., a portable terminal, for electro-optically reading targets located in a field of view of the camera. The system includes a housing having walls bounding an interior in which the device is received and held. One of the walls is a generally planar rear wall that covers a rear side of the device. The housing also has a top extension extending away from the rear wall at a top region of the device. Preferably, the top extension is integral with the housing.

An optical element, e.g., a fold mirror, is mounted on the top extension and is spaced away from a camera lens located at the rear side and the top region of the device. The optical element is inclined relative the rear wall, preferably at an acute angle of inclination relative to the rear wall, and is operative for receiving at least a portion of the field of view imaged by the camera from each target along a first direction, and for folding and redirecting the field of view along a second direction generally perpendicular to the rear wall through the camera lens to the camera. Advantageously, the optical element is also spaced away from a flash unit located at the rear side and the top region of the device, in which case the optical element is operative for receiving light emitted by the flash unit along a first direction generally perpendicular to the rear wall, and for folding and redirecting the emitted light along a second direction different from the first direction.

In a preferred embodiment, a handle is connected to the housing and extends away from the rear wall. A trigger assembly is supported by the handle to initiate reading when manually actuated by the user. In one configuration, the trigger assembly is operative for generating and conveying an optical trigger signal to the camera to initiate reading, in which case the trigger assembly includes a light source for emitting the optical trigger signal, and an optical train for directing the optical trigger signal from the light source to and through the camera lens. In another configuration, the trigger assembly is operative for generating and conveying an acoustic trigger signal to a microphone on the device to initiate reading, in which case the trigger assembly includes a speaker for emitting the acoustic trigger signal, and a sound chamber for directing the acoustic trigger signal from the speaker to the microphone.

A method of adapting a wireless mobile device having a camera to an electro-optical reader for electro-optically reading targets located in a field of view of the camera, is performed by receiving and holding the device in a housing having walls bounding an interior, configuring one of the walls as a generally planar rear wall that covers a rear side of the device, extending a top extension away from the rear wall at a top region of the device, mounting an optical element on the top extension and spacing the optical element away from a camera lens located at the rear side and the top region of the device, and inclining the optical element relative the rear wall to receive at least a portion of the field of view imaged by the camera from each target along a first direction, and to fold and redirect the field of view along a second direction generally perpendicular to the rear wall through the camera lens to the camera.

Figure 1:
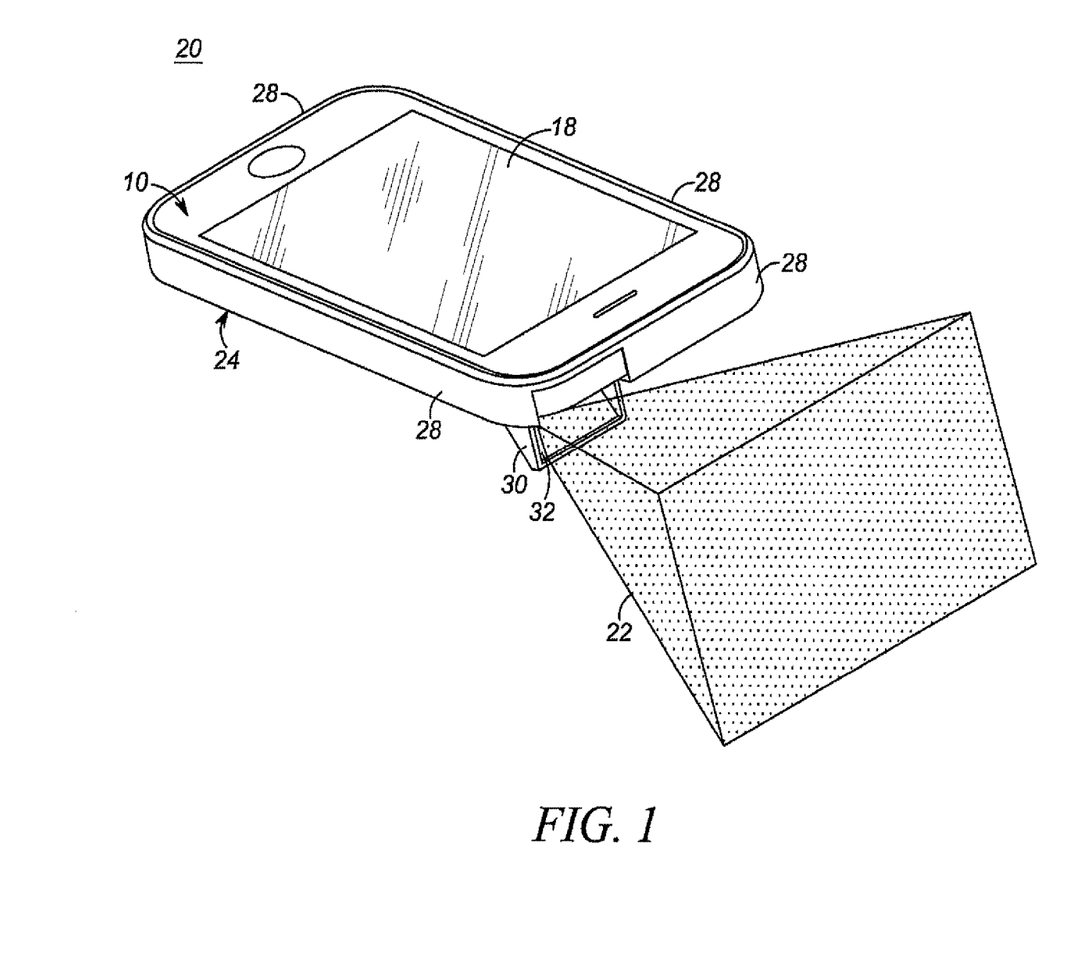
FIG. 1 is a perspective view as seen from above of one embodiment of a system for adapting a wireless mobile device to a handheld electro-optical reader in accordance with the present disclosure.
Figure 2:
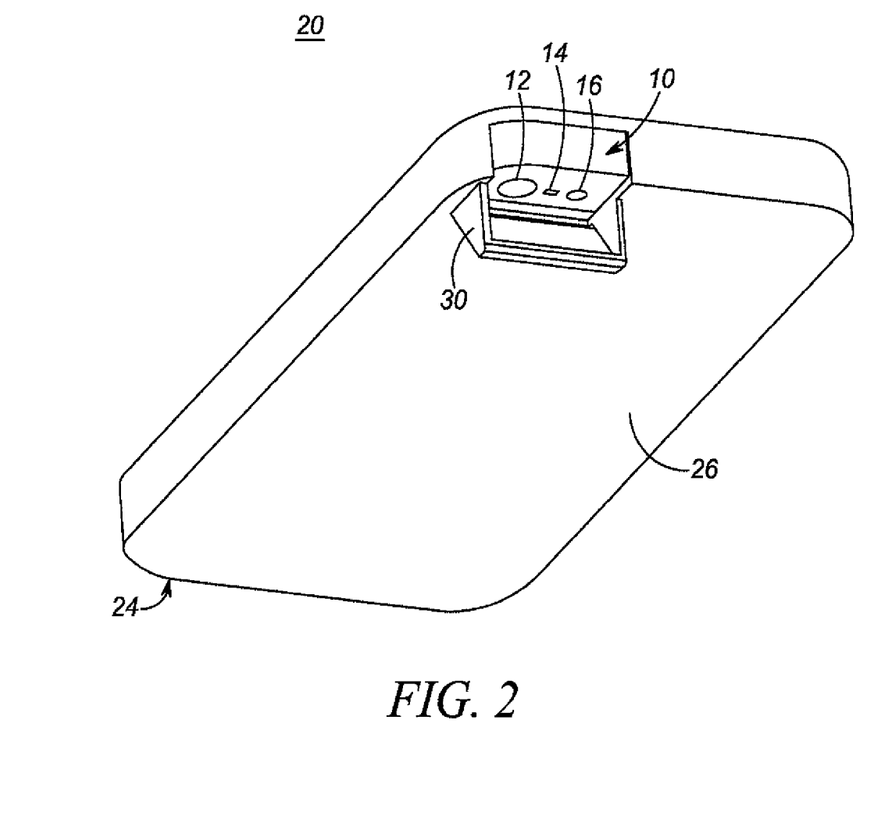
FIG. 2 is a perspective view of the system of FIG. 1 as seen from below.
Figure 3:
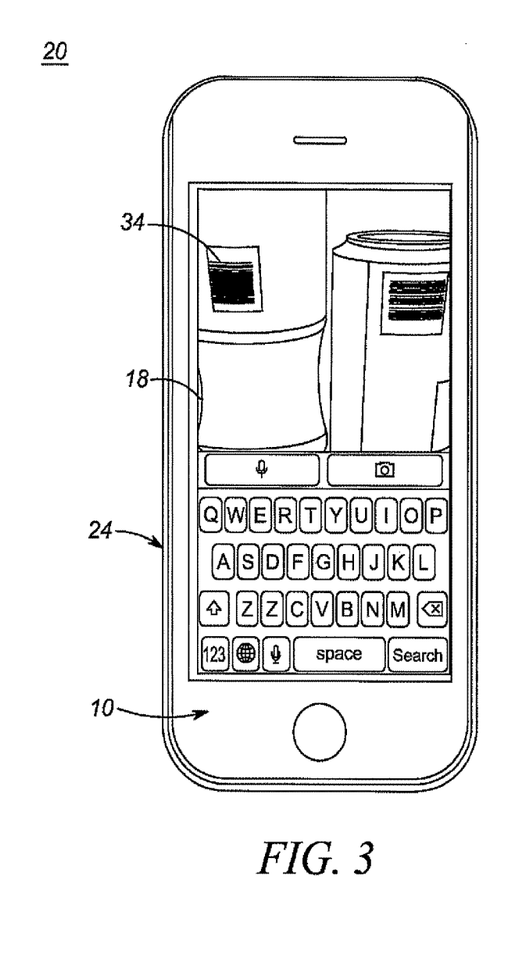
FIG. 3 is a top plan view of the system of FIG. 1.

Turning now to the embodiment of FIGS. 1-3 of the drawings, reference numeral 10 generally identifies a wireless communications mobile device, e.g., a smart phone, having a built-in camera. As illustrated, the device 10 is a smart phone marketed by Apple, Inc. as an iPhone (trademark). The form factor for this device 10 is a bar, also known as a slate, having a generally rectangular cuboid or generally flattened, box-like configuration with rounded or angled corners and edges. A generally rectangular touch screen 18 is mounted at a front side of the device 10. As illustrated in FIG. 2, the device 10 has a camera lens 12 for the built-in camera, a noise cancelling microphone 14, and a flash unit 16 located adjacent one another at an opposite rear side and at a top region of the device 10. A similar form factor and component layout pertains for such devices from other manufacturers. This invention is directed to adapting this device 10 so that it will serve as an electro-optical terminal or handheld reader 20 for electro-optically reading targets, such as bar code symbols, located in a field of view 22 of the camera. Although the device 10 has been illustrated as an iPhone (trademark), this invention is not intended to be limited to this particular device, because it will be understood that other smart phones, cell phones, tablets, personal digital assistants, or like handheld devices could benefit from, and be adapted for use with, this invention.

A housing 24, also known as a nest or cradle, has a plurality of walls bounding an interior in which the device 10 is received through an open front side of the housing 24. One of the walls is a generally planar rear wall 26 that covers a rear side of the device 10. Side walls 28 extend upwardly from the rear wall 26 and peripherally surround and hold the device 10 within the interior of the housing 24. A top extension 30 extends at an acute angle of inclination away from the rear wall 26 at a top region of the device 10 in the vicinity of the camera lens 12, microphone 14, and flash unit 16. Advantageously, the top extension 30 is integral with all the walls of the housing 24, and they are all constituted of a one-piece, molded plastic construction.

An optical element, e.g., a generally planar fold mirror 32, is mounted in the top extension 30 and is spaced away from, and lies under, the camera lens 12, microphone 14, and flash unit 16. The fold mirror 32 is inclined at an acute angle of inclination relative the rear wall 26 and is operative, as best described below and best shown in FIGS. 5-6, for receiving at least a portion of the field of view 22 imaged by the camera from each target along a first generally horizontal direction, and for folding and redirecting the field of view 22 along a second generally vertical direction generally perpendicular to the rear wall 26 through the camera lens 12 to the camera, and also for receiving light emitted by the flash unit 16 along a first generally vertical direction generally perpendicular to the rear wall 26, and for folding and redirecting the emitted light along a second generally horizontal direction different from the first direction.

In use, as shown in FIG. 1, the system 20 is held in a user's hand in a generally horizontal orientation, and the field of view 22 increases in volume in a direction away from the user. This contrasts with the traditional way of holding the device 10 in a generally vertical orientation to capture an image. As shown in FIG. 3, an image 34 of a target is displayed on the touch screen 18. The user can now touch the image 34 to focus, decode and read the target. The displayed image and the electronic keyboard are readily visually and manually accessible to the user so that the system of FIGS. 1-3 is ergonomically friendly and convenient to use. It will be understood that the system 20 has a low profile and compact size and may therefore be conveniently and easily placed in the user's pocket or purse.

Figure 4:
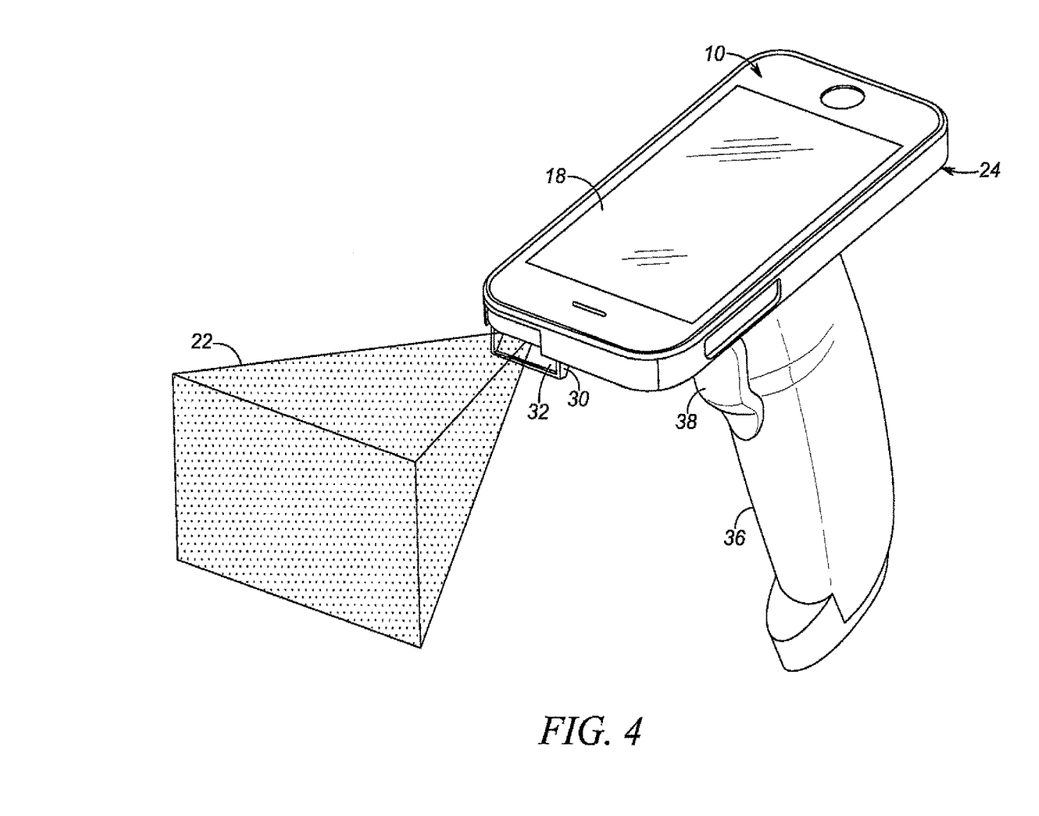
FIG. 4 is a perspective view as seen from above of another embodiment of a system for adapting a wireless mobile device to a handheld electro-optical reader in accordance with the present disclosure.
Figure 5:
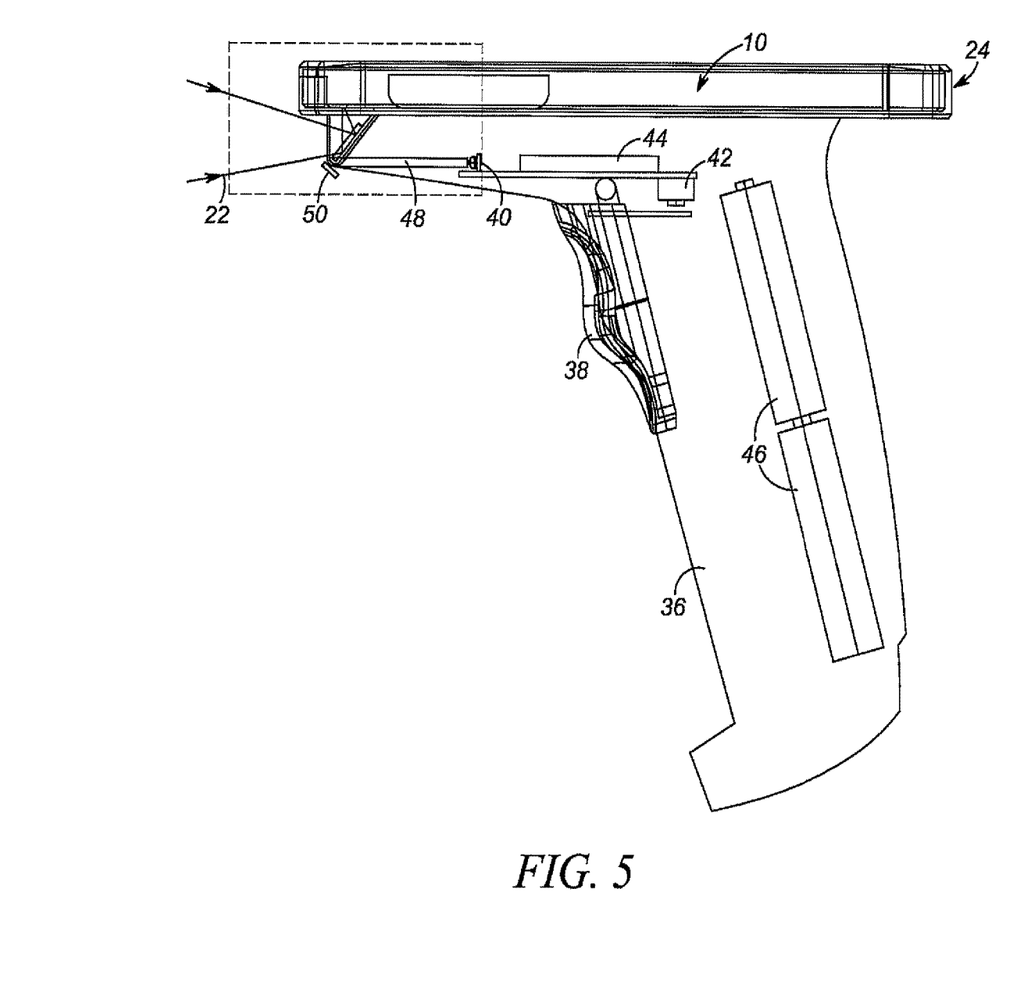
FIG. 5 is a side sectional of the system of FIG. 4.
Figure 6:
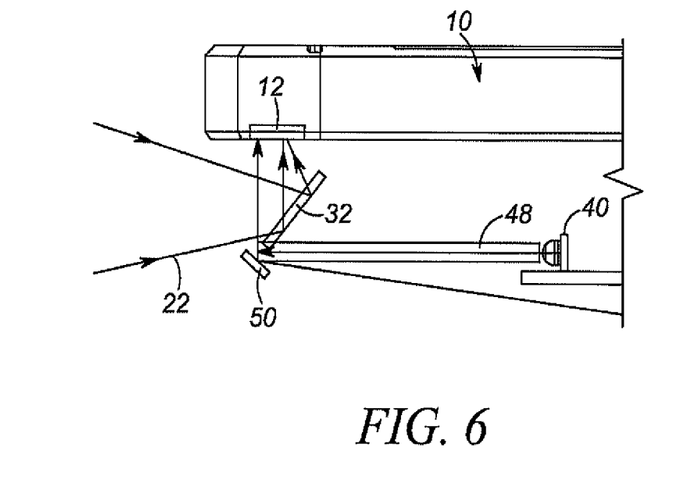
FIG. 6 is an enlarged view of the boxed detail of FIG. 5.

Turning now to the embodiment of FIGS. 4-6 of the drawings, a handle 36 is connected to the housing 24 in a gun-like form factor in which the handle 36 extends downwardly and rearwardly away from the rear wall 26. A trigger assembly including a manually depressable trigger 38 is mounted on the handle 36 to initiate reading when the trigger 38 is manually depressed by the user. The trigger assembly includes a light source, e.g., a light emitting diode (LED) 40, a trigger switch 42, an optical drive circuit 44, a battery pack 46, a light pipe 48, and a mirror 50. When the trigger 38 is depressed, power from the battery pack 46 is switched through the switch 42 and the drive circuit 44 to energize the LED 40 for emitting light, i.e., an optical trigger signal. This emitted light is conducted along the light pipe 48, and reflected by the mirror 50 into and through the camera lens 12 to be detected by the camera. This emitted light may be colored, i.e., at a predetermined frequency that can be detected by the camera. Once this optical trigger signal has been detected, the camera can now read any target in its field of view that has been folded by the fold mirror 32.

Figure 7:
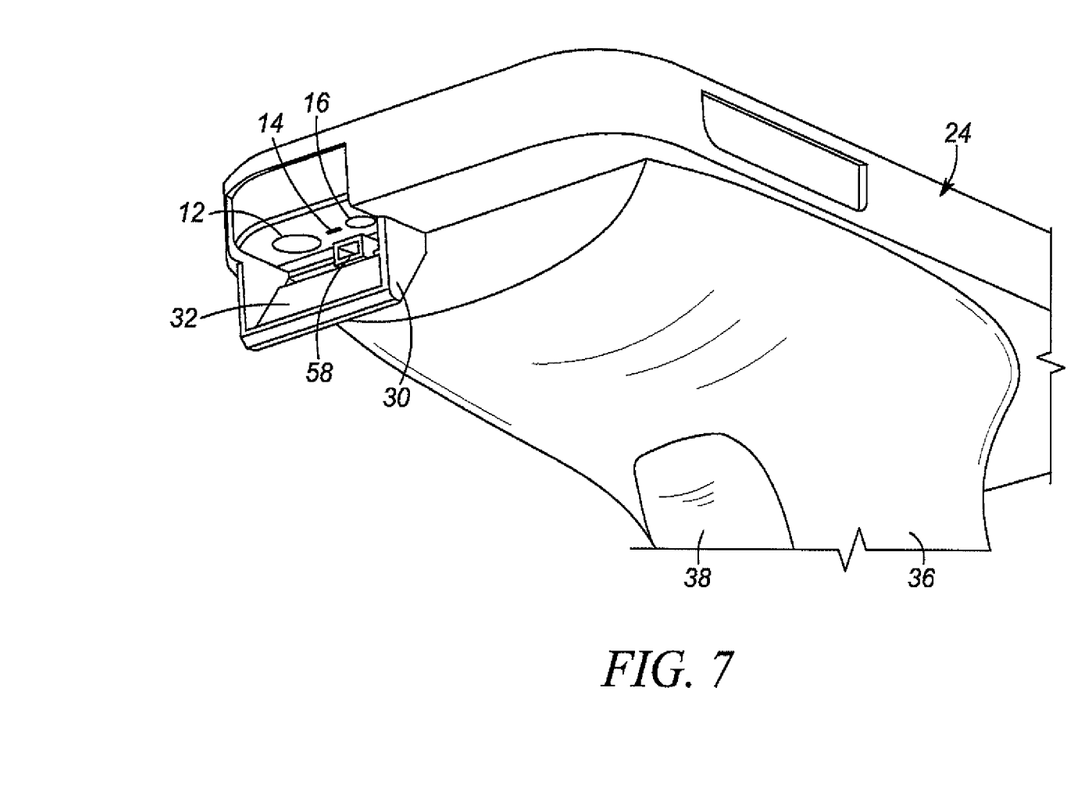
FIG. 7 is a perspective view as seen from above of still another embodiment of a system for adapting a wireless mobile device to a handheld electro-optical reader in accordance with the present disclosure.
Figure 8:
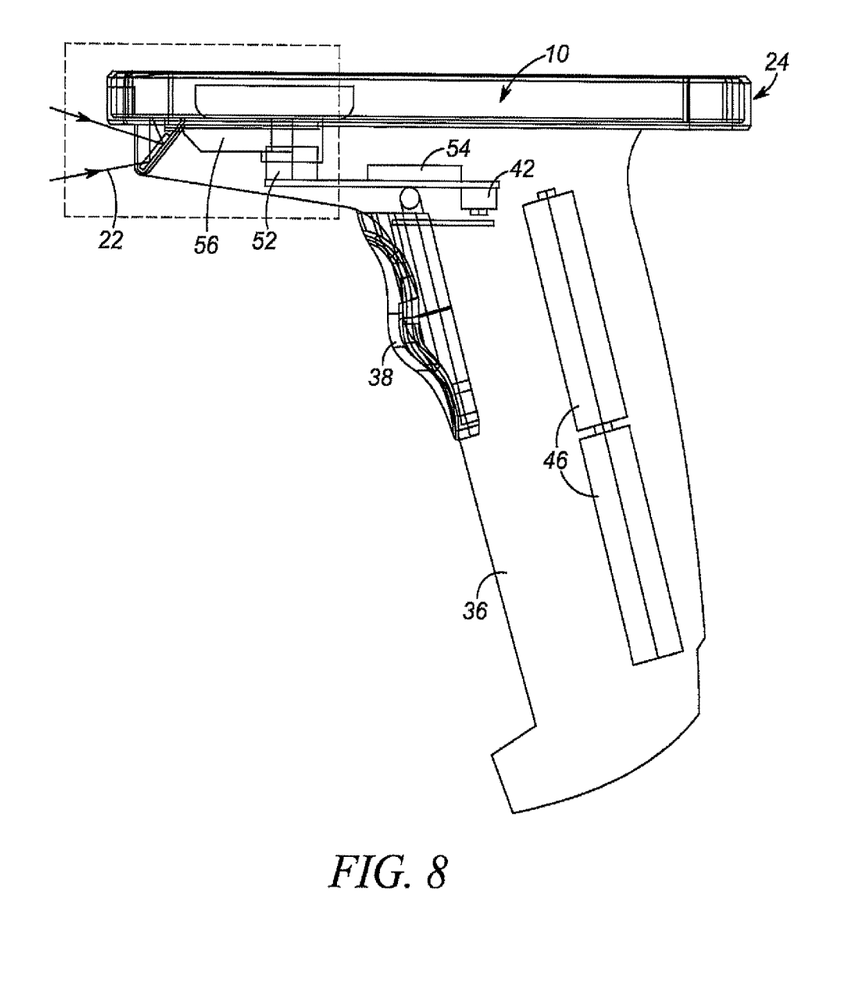
FIG. 8 is a side sectional of the system of FIG. 7.
Figure 9:
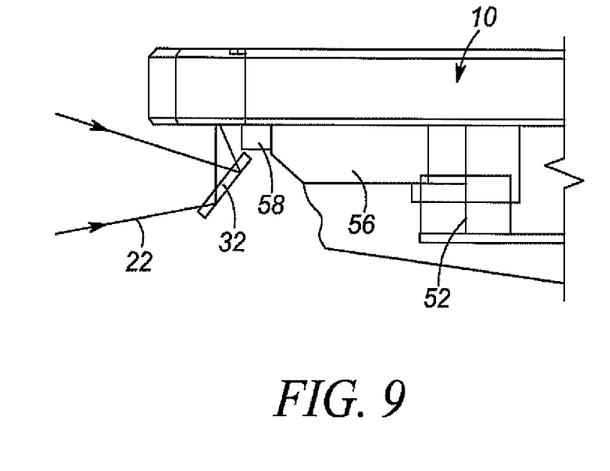
FIG. 9 is an enlarged view of the boxed detail of FIG. 8.

Turning now to the embodiment of FIGS. 7-9 of the drawings, the handle 36 is again connected to the housing 24 in a gun-like form factor in which the handle 36 extends downwardly and rearwardly away from the rear wall 26. The trigger assembly including a manually depressable trigger 38 is mounted on the handle 36 to initiate reading when the trigger 38 is manually depressed by the user. The trigger assembly includes a speaker 52, the trigger switch 42, an acoustic drive circuit 54, the battery pack 46, and a sound chamber 56 having an exit port 58 (see FIG. 7). When the trigger 38 is depressed, power from the battery pack 46 is switched through the switch 42 and the drive circuit 54 to energize the speaker 52 for emitting sound, i.e., an acoustic trigger signal. This emitted sound is conducted along the sound chamber 56, and exits the exit port 58 in the immediate vicinity of the microphone 14 to be detected by the microphone. This emitted sound may have a predetermined frequency that can be detected by the microphone. Once this acoustic trigger signal has been detected, the camera can now read any target in its field of view that has been folded by the fold mirror 32. In another embodiment, rather than driving a speaker, the acoustic signal could be generated by any instrument capable of making sounds, such as a clicker that produces a clicking sound when the trigger 38 is depressed.

Figure 10:
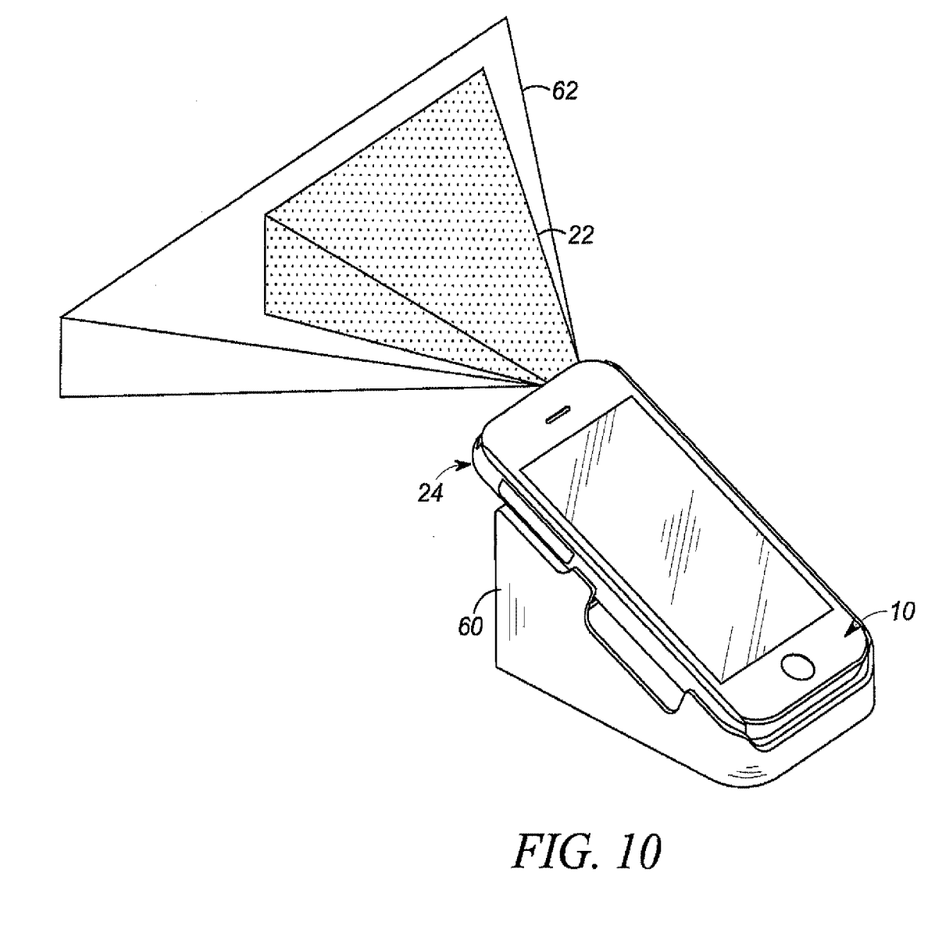
FIG. 10 is a perspective view as seen from above of yet another embodiment of a system for adapting a wireless mobile device to an electro-optical reader in accordance with the present disclosure.

FIG. 10 of the drawings indicates that the system need not be handheld in use, but can also be mounted on a stationary stand 60, which is of particular utility in a retail venue or workstation. FIG. 10 also illustrates the field of view 22 of the camera, as well as the illumination field 62 of the flash unit 16.

As described above, the lower handle 36 contains all the necessary electronics, and the upper housing 24, which holds the device 10, is a passive plastic enclosure. To adapt this system to a specific device 10, a dedicated design of this passive housing 24 is required. The handle 36 is the same for any device 10, and is adapted to a specific device 10 by selecting the appropriate passive housing 24 and affixing it to the common handle 36. Since only the upper housing 24 must change to accommodate different devices 10, and since the upper housing 24 can usually be fabricated out of one or two simple injection molded parts, the manufacturer can react very quickly when new devices 10 become available, or when a customer wants to use a device 10 for which an upper housing 24 did not previously exist. It will not be necessary to create new electrical circuit boards, or to obtain new regulatory approvals. It will not be necessary to locate and design for new electrical connectors to plug into the new device 10, or to develop new communication protocols between the device 10 and the handle electronics, or any of the other activities normally associated with development or modification of an electronic device.

The upper housing 24 is a nest into which the device 10 can be installed. This nest surrounds the back and edges of the device 10 protecting it from physical abuse. This can include completely covering the device 10 to the point of making it waterproof (with a thin transparent overlay over the touch screen 18 and a Gore-Tex membrane over the speaker 52), if desired. The fold mirror 32 enables the device's own built-in camera to be used to read bar code symbols, thereby eliminating the need for the additional scan engine used in many prior art sleds.

In use, scanning must be initiated when the user presses the trigger 38 on the handle 36. As described above, in one exemplary embodiment, the desire to trigger scanning is transmitted by an acoustic trigger signal that is produced in the handle 36 when the trigger 38 is pressed. The speaker 52 that produces this acoustic signal is located on the top of the handle 36 in the area where the upper housing 24 (which holds the device 10) is attached. The acoustic signal is piped through the sound chamber 56, or through channels molded into the upper housing 24 to one of the microphone on the device 10. The sound channels can be enclosed on its upper surface by the rear side of the device 10 and on its other three surfaces by grooves or channels molded into the upper housing 24.

It is undesirable for a user to hear the acoustic signal. Hence, it can consist of a tone, a pair of tones, a sequence of tones, etc., all of which are close to the upper frequency range of human hearing. The sound channels in the upper housing 24 will guide the sound near to wherever the microphone is located on the device 10 for which it is designed, and so the sound signal need not be very loud. This, plus the fact that the sound signal is of a frequency that is difficult to hear, will make the acoustic signal inaudible to the user. Many devices include a microphone on the back of the device near the camera, and is used to capture audio when using the camera to capture video. If that microphone is used, the sound signal can be piped by channels molded into the upper housing 24 directly to that microphone, preventing the sound from escaping, further reducing the possibility of the user hearing the sound signal. If the device does not have a microphone dedicated to taking video, the sound can be piped close to whatever microphone the device does have. It is important to realize that the piped signal does not need to be coupled directly to the microphone, and radiating the sound signal into the air at a place close to the microphone will be sufficient.

In an alternative embodiment, the speaker 52 that generates the acoustic signal can be located in the housing 24 designed for a specific device 10, instead of locating the speaker 52 in the handle 36. The speaker 52 can be located in the housing 24 close to where the microphone is located on the specific device for which the housing 24 is designed. An electrical connector on the bottom of the housing 24 can mate with an electrical connector on the top of the handle 36, to conduct the drive signal to the speaker 52. All housings will have this connector located in the same place, regardless of where the speaker 52 is located, and so all housings will be able to plug into the same universal handle 36. Locating the speaker 52 in the housing 24, instead of in the handle 36, adds a bit of cost to the housing 24, but also reduces power consumption, since the speaker 52 will be close to the microphone, and, as a result, the speaker 52 does not need to produce as loud an acoustic signal.

It also avoids the need to take into consideration how the sound conduits used to pipe the acoustic signal to the device 10 may impact the sound volume. For example, conduits of different lengths can resonate at different frequencies, and produce sound nulls at different places, etc., which can impact the volume of sound emitted to the microphone in the device 10. This can be overcome by proper acoustic design, but simply moving the speaker 52 close to the microphone 14 eliminates the need to take these issues in to account. This will minimize development time of each new housing, which will probably be more important than saving the cost of mounting the small, inexpensive speaker 52 in the sled. A simple circuit board can be designed for each sled, which has the speaker 52 and the connector that mates to the handle 36 mounted on it in the appropriate places. Circuit boards are simple, fast and inexpensive to create, and so this solution is perfectly compatible with the goals of this invention.

In yet another exemplary embodiment described above, the desire to begin scanning can be transmitted optically to the device 10 from the handle 36. This can be done by locating the LED 40 in the housing 24 where the LED 40, or the light projected by the LED 40, is visible to the camera in the device 10. The LED 40 can be electrically connected to a connector on the bottom of the housing 24 that mates to the universal handle 36, just as described for the speaker 52 above. Use of the LED 40 has the advantage of totally eliminating any circuitry in the handle 36, except perhaps a resistor or current source to limit battery current into the LED 40. When the user presses the trigger 38, the LED 40 is turned on. The image from the camera in the device 10 is continuously or frequently monitored to detect when a light in the expected portion of the field of view 22 and of the expected color becomes visible. When that occurs, the camera begins attempting to decode bar code symbols, until a symbol is decoded, or until the LED 40 turns off. A timer circuit can be included in the handle 36 to turn the LED 40 off after a predetermined time, to keep the handle batteries 46 from being discharged if the trigger 38 is held down accidentally for a long time. An alternative solution would be to blink a green LED, for example, when it is desired to initiate scanning, and to blink a red LED to stop scanning.

The light from this trigger LED 40 must be visible to the camera, but must not obstruct the camera's view of the symbol, or interfere in any way with the decoding of the symbol. This can be accomplished by locating the LED 40, or a target illuminated by the LED 40, or an optical element that directs light from the LED 40, to a place where it can be seen by the camera, e.g., in a corner, or near an edge of the camera's field of view 22, or by using two different color LEDs to enable and disable scanning. The LED 40 can be directly in the field of view 22, because it is turned off during actual symbol scanning.

The drive electronics for the LED 40 triggering, just described, are very simple, and the drive electronics for acoustic activation are also quite simple. For acoustic activation, the drive electronics can consist of nothing but a simple oscillator circuit to drive the small speaker 52. Small speakers, such as those commonly used in earbuds used with an iPod (trademark), are very efficient and can produce sound frequencies up to the upper limits of human hearing (around 20 kHz). When the trigger 38 is pressed, power is applied to the oscillator circuit, and the speaker 52 produces the acoustic signal that is received by the microphone 14 in the device 10. When the expected acoustic signal is detected, the device 10 turns on the illumination LED 40 and attempts to decode a symbol if there is one within the camera's field of view 22. The attempt to decode continues as long as the trigger 38 is pressed, or until a successful decode occurs. Once a decode occurs, the trigger 38 must be released, so that the acoustic signal stops, and then the trigger 38 is pressed again to restart the acoustic signal, and to re-initiate scanning.

If desired, more complex utilizations of the acoustic signal can be implemented. For example, there can be a short burst of one frequency when the trigger 38 is pressed, and a burst of a different frequency when the trigger 38 is released. These two frequencies alert the device 10 to start and stop scanning, respectively. The advantage of this is that since the acoustic signal does not have to be continuously produced, less power is consumed. Another possibility is to include a timer in the handle electronics that will limit how long the acoustic signal is produced to a few seconds, even if the trigger 38 has not been released. This will avoid using up the battery pack 46, even if something accidentally holds the trigger 38 down for an extended time.

Even though it is often desirable to totally avoid any direct electrical connection to the device 10 (since different devices use different connectors), it is possible to send a trigger signal to the device 10 through the earphone jack, since that jack includes a contact for a microphone on some devices 10. The important thing is that these connectors are standardized across the vast majority of devices, so that the same plug can be used for a large variety of configurations with different devices. The housing 24 designed for each device 10 could include a recess to allow a cable with an earphone plug to be routed to a place near the earphone socket on the particular device. The earphone connector will then be plugged in to the device when it is installed in the housing 24, to enable all the functions discussed above.

Since the electrical circuitry in the handle 36 is so simple, and since small speakers 52 or LEDs 40 are so efficient, power consumption of the handle electronics will be very low. For example, it is not unreasonable to assume that the total current draw can be around 15 ma or less. Alkaline AA cells have a capacity of around 2800 mAh. Hence, if two alkaline AA cells 46 are installed in series in the handle 36, they will have enough capacity to last an entire year with usage as high as over 900 scans a day, 365 days a year. Triggering the device 10 via the LED 40 visible to the camera can be even more efficient, and could provide as much as three times that battery life. This assumes the trigger 38 is pressed for two seconds for each symbol scanned. However, most decodes are faster than that, and so the batteries 46 will probably last even longer. With this much battery capacity, there is no need to use rechargeable batteries, which cost more and require a charger. There is also no need to set aside space to plug in multiple chargers, and to place the handles while recharging. It is much less labor for a user to replace batteries once a year than to charge a system that uses rechargeable batteries every few days, as is needed with prior art solutions. Hence, this system described in this disclosure has a much lower total cost of ownership than prior art systems.

When using this invention, a software application needs to be loaded on to the device 10. Only two versions of the application (for Android and Apple operating systems) need to be created to cover the vast majority of smart phones. The application will include decode algorithms for symbol scanning, software to detect the trigger acoustic signal and to reject sounds that do not match the expected acoustic signal if acoustic triggering is used, or software to detect the LED light if LED triggering is used. It will also be possible to include features in the application to adjust the sensitivity of the microphone 14, in the event that different devices have different microphone sensitivities. The application can also include the facility to transmit scanned data over Bluetooth or Wi-Fi protocols, to provide for manual data input via a touch keyboard displayed on the touch screen 18, to provide audible and visual feedback when a symbol is successfully scanned, etc. A handy feature for some users will be to superimpose a cross-hair pattern over the real-time camera image 34 displayed on the screen 18, to enable pick-list scanning, or scanning only one specific selected symbol from several that may all be within the camera's field of view 22 at the same time. Virtually every function traditionally performed by dedicated mobile terminals can be implemented.

Some users may want additional functions aside from symbol scanning. For example, it may be desired to be able to swipe the magnetic stripes on credit cards. If this is the situation, a magnetic stripe reader can be mounted on the handle 36, and the data can be transmitted to the device 10 by an acoustic modem in the handle 36, or by modulating the LED light. This will use more power, and so it may require rechargeable batteries, but it is still far less expensive than other solutions, and far easier to adapt to a variety of devices. Other possibilities are to include additional illumination projected from the front of the handle 36 into the camera's field of view 22 to improve scanning performance, or projection of an aiming beam to facilitate pick list modes.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of adapting a wireless mobile device having a camera to an electro-optical reader for electro-optically reading targets located in a field of view of the camera, comprising:

receiving and holding the device in a housing having walls bounding an interior;

configuring one of the walls as a generally planar rear wall that covers a rear side of the device;

extending a top extension away from the rear wall at a top region of the device;

mounting an optical element on the top extension and spacing the optical element away from a camera lens located at the rear side and the top region of the device;

inclining the optical element relative to the rear wall to receive at least a portion of the field of view imaged by the camera from each target along a first direction, and to fold and redirect the field of view along a second direction generally perpendicular to the rear wall through the camera lens to the camera;

connecting a handle, having a trigger assembly and a light source, to the housing, and extending the handle away from the rear wall; and mounting a second optical element on the handle, and inclining the second optical element to (i) receive an optical signal generated by the light source responsive to actuation of the trigger assembly and (ii) redirect the optical signal to the camera lens to initiate reading by the wireless mobile device.

2. The method of claim 1, wherein the receiving is performed by receiving the device through an open front side of the housing, and configuring the housing with side walls that extend upwardly from the rear wall; and integrating the top extension with the walls of the housing.

3. The method of claim 1, further comprising: spacing the optical element away from a flash unit located at the rear side and the top region of the device, and receiving light emitted by the flash unit by the optical element along a first direction generally perpendicular to the rear wall, and folding and redirecting the emitted light along a second direction different from the first direction.

4. The method of claim 1, further comprising: configuring the optical element as a generally planar fold mirror supported by the top extension at an acute angle of inclination relative to the rear wall.

5. The method of claim 1, wherein mounting the second optical element comprises mounting the second optical element spaced away from the camera lens and adjacent to a top edge of the optical element.

6. The method of claim 5, further comprising arranging the light source within the handle at a distance from the rear side greater than a distance between the rear side and the top edge of the optical element.

7. A method of adapting a wireless mobile device having a camera to an electro-optical reader for electro-optically reading targets located in a field of view of the camera, comprising:
- receiving and holding the device in a housing having walls bounding an interior;
- configuring one of the walls as a generally planar rear wall that covers a rear side of the device;
- extending a top extension away from the rear wall at a top region of the device;
- mounting an optical element on the top extension and spacing the optical element away from a camera lens located at the rear side and the top region of the device; and
- inclining the optical element relative to the rear wall to receive at least a portion of the field of view imaged by the camera from each target along a first direction, and to fold and redirect the field of view along a second direction generally perpendicular to the rear wall through the camera lens to the camera;
- connecting a handle having a trigger assembly to the housing, and extending the handle away from the rear wall;
- mounting, on the handle, a speaker for generating an acoustic signal responsive to an actuation of the trigger assembly, and for directing the acoustic signal to a microphone of the device to initiate reading by the device.

8. The method of claim 7, wherein the receiving is performed by receiving the device through an open front side of the housing, and configuring the housing with side walls that extend upwardly from the rear wall; and integrating the top extension with the walls of the housing.

9. The method of claim 7, further comprising: spacing the optical element away from a flash unit located at the rear side and the top region of the device, and receiving light emitted by the flash unit by the optical element along a first direction generally perpendicular to the rear wall, and folding and redirecting the emitted light along a second direction different from the first direction.

10. The method of claim 7, further comprising configuring the optical element as a generally planar fold mirror supported by the top extension at an acute angle of inclination relative to the rear wall.

11. The method of claim 7, wherein mounting the speaker comprises mounting the speaker within the handle, and wherein the method further comprises:
- providing a sound chamber for receiving the acoustic signal from the speaker; and
- providing an exit port adjacent to the microphone and connected to the sound chamber.

12. The method of claim 11, wherein providing the exit port comprises providing the exit port at a base of the top extension.

* * * * *